United States Patent [19]

Witzel

[11] 4,329,833
[45] May 18, 1982

[54] SELF-PROPELLED HARVESTING COMBINE

[76] Inventor: Homer D. Witzel, 1700 Gulf Blvd., Englewood, Fla. 33533

[21] Appl. No.: 225,002

[22] Filed: Jan. 14, 1981

[51] Int. Cl.³ .............................................. A01D 75/22
[52] U.S. Cl. ...................................... 56/228; 56/15.3; 56/15.5; 56/15.6
[58] Field of Search ....................... 56/228, 14.9, 15.3, 56/15.1, 15.2, 15.5, 15.6, 15.7, 15.8

[56] References Cited

U.S. PATENT DOCUMENTS

| | | | |
|---|---|---|---|
| 2,850,863 | 9/1958 | Pierson | 56/228 |
| 3,240,005 | 3/1966 | Rowse | 56/228 |
| 3,893,283 | 7/1975 | Dandl | 56/228 |
| 4,084,394 | 4/1978 | Lely | 56/228 |

*Primary Examiner*—Robert A. Hafer
*Attorney, Agent, or Firm*—Harness, Dickey & Pierce

[57] ABSTRACT

A self-propelled harvesting combine having a crop treatment means and a crop gathering means. The crop treatment means supported on a first wheeled chassis, which supports a power source for propulsion of the combine, operation of the crop separating and operation of the crop gathering means. The crop gathering means is supported on a second wheeled chassis which is pivotally mounted to the first wheeled chassis to be movable between a first position lying beside the first wheeled chassis and a second position trailing behind the first wheeled chassis. The crop gathering means is pivotally mounted on the second wheeled chassis for rotation about a substantially vertical axis between a first position lying transversely on the second wheeled chassis and a second position lying longitudinally thereon, wherein when the second wheeled chassis is beside the first wheeled chassis and the crop gathering means is located transversely on the second wheeled chassis, the crop gathering means lies transversely in front of the crop treatment means and the outlet of the crop gathering means is in communication with the inlet of the crop treatment means.

18 Claims, 6 Drawing Figures

SELF-PROPELLED HARVESTING COMBINE

This invention relates to a self-propelled harvesting combine.

Most harvesting combines currently in use have a crop gathering means mounted and supported to the same chassis as that supporting the crop treatment means. Such an arrangement limits the versatility of the combine since the desired width of each of the crop gathering means is limited by the fact that the combine must also travel through gates, and along narrow roads and tracks. The width of cut is also limited by the structural loading exerted on the chassis. In addition, as the width of cut is increased, the degree of vertical movement of the ends of the crop gathering means become intolerable as the combine moves over undulating ground.

It is an object of this invention to provide a self-propelled harvesting combine whereby the support for the crop gathering means and the crop treatment means are independent.

It is also an object of this invention to provide a combine which may be readily converted to take up a transport position having a reduced width, and from which position the combine is readily converted to the operating mode.

In one form the invention resides in a self-propelled harvesting combine comprising; a crop treatment means supported on a first wheeled chassis, wherein the wheeled chassis supports a power source for propulsion of the combine, operation of the crop treatment and operation of the crop gathering means; and the crop gathering means is supported on a second wheeled chassis; said second wheeled chassis being pivotally mounted to the first wheeled chassis to be movable between a position trailing behind the first wheeled chassis and a position lying beside the first wheeled chassis; said crop gathering means being pivotally mounted on said second wheeled chassis for rotation about a substantially vertical axis between a position lying transversly on said second wheeled chassis and a position lying longitudinally thereon; wherein when the second wheeled chassis is beside the first wheeled chassis and the crop gathering means is located transversly on the second wheeled chassis, the crop gathering means lies transversly in front of the crop treatment means and the outlet of the crop gathering means is in communication with the inlet of the crop treatment means.

The invention will be more fully understood in the light of the following description of two specific embodiments. The description is made with reference to the accompanying drawings of which.

Figure 1:
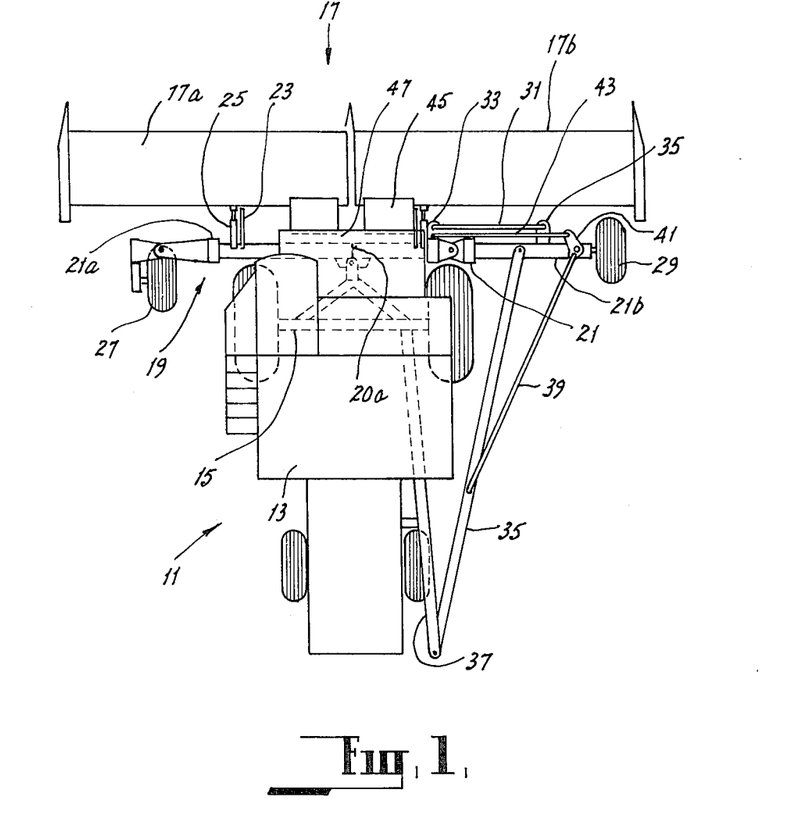
FIG. 1 is a plan view of a self-propelled harvesting combine according to the first embodiment in the crop gathering mode.

The combine 11 of the first embodiment is of the self-propelled type and comprises a crop gathering means 13 supported on a first wheeled chassis 15 which also supports a power source and drive means for the wheels of the first wheeled chassis and for the machinery of the crop treatment means 13. The combine further comprises a crop gathering means 17 which is supported on a second wheeled chassis 19.

Figure 2:
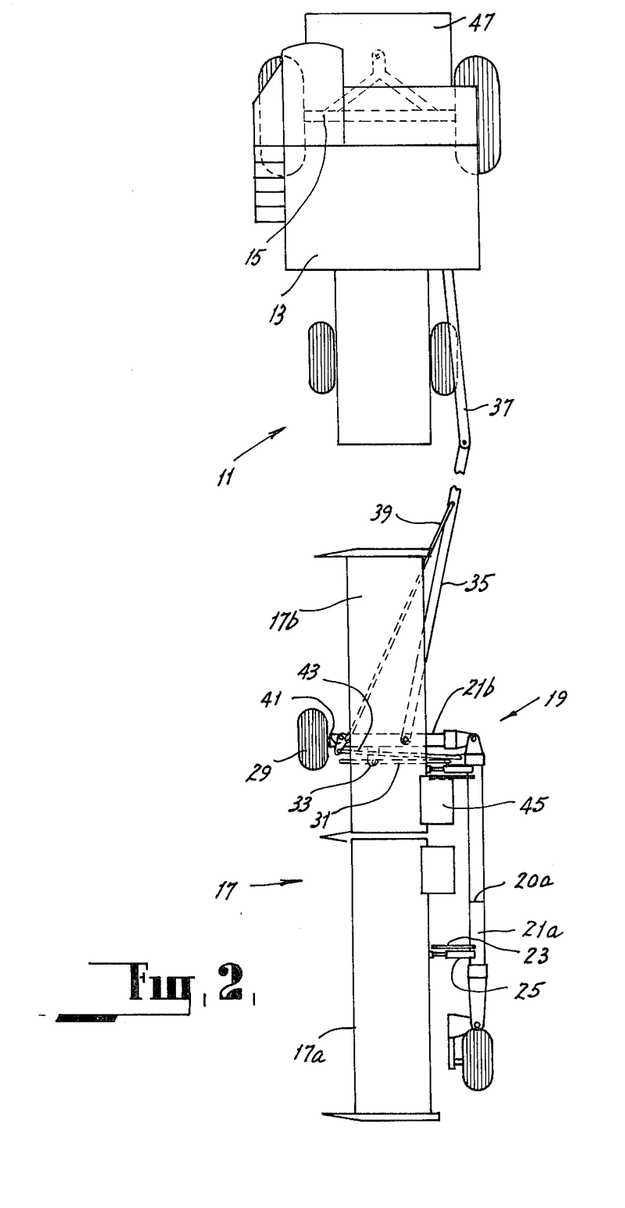
FIG. 2 is a plan view of the harvesting combine of FIG. 1 in the transport mode.

The crop gathering means 17 comprises a pair of gathering heads 17a and 17b, pivotally connected together in side by side relationship. Each crop gathering head 17a and 17b is pivotally supported on an articulated main beam 21 of the second wheeled chassis by means of a paralellogram linkage 23 and a hydraulic cylinder 25 which together serve to control the height of the crop gathering means both during the crop gathering action and in raising the crop gathering means prior to its movement to the transport position. The articulated main beam 21 of the wheeled chassis 19 has a first portion 21a which is supported at its outer end by a wheel 27 mounted in castor relation to the main beam 21 and is pivotally connected at its other end about a vertical axis to a second portion 21b of the main beam having a fixed wheel 29 mounted to its free end. The two portions of the main beam 21 are further connected by a strut 31 which interconnects horizontally outwardly extending lugs 33 provided on each portion 21a and 21b of the main beam 21. The strut 31 is provided with two positions for connection to the lug 33 located on the second portion 21b of the main beam whereby the two portions of the main beam may be positioned in line with each other as shown at FIG. 1, or alternatively the second portion 21b may be transposed to a position lying perpendicular to the first portion 21a in the horizontal plane as shown at FIG. 2. The second wheeled chassis further comprises a rearwardly extending truss frame 35 pivotally mounted at one end to an intermediate point on the second portion 21b of the main beam and pivotally mounted at its other end to a rearwardly extending frame member 37 of the first wheeled chassis 15. A bell crank 41 is pivotally mounted on the second portion 21b of the main beam and is connected via a link 39 to the truss frame. The other end of the bell crank is connected via a second link 43 to the lug 33 provided on the first portion 21a of the main beam 21. The function of the bell crank 41 and the links 39 and 43 is to maintain a constant relative position between the truss frame 35 and the main beam 21 and to enable the relative position of the truss frame 35 and the main beam 21 to be varied as the main beam is transposed from its co-linear orientation to its perpendicular orientation.

In addition the function of the rearwardly extending truss 35 and the rearwardly extending frame member 37 of the first wheeled chassis 15 is to provide an upwardly directed counter-moment to the rear of the first wheeled chassis to compensate for the absence of a conventional crop gathering means which is normally supported at the front of the first wheeled chassis 15.

The first portion 21a of the main beam 21 is provided at an intermediate point therealong with means for engagement with the first wheeled chassis 15 when the main beam 21 is co-linear and is located transversly across the front of the first wheeled chassis 15. In addition the first portion 21a of the main beam 21 is provided with a substantially horizontally disposed transverse hinge point 20a adjacent the point of engagement with the first chassis which is capable of being locked to maintain the first portion in a co-linear orientation.

When the first portion 21a is interconnected with the first wheeled chassis the hinge point 20a is unlocked to allow for articulation of the main beam about the hinge point and thus the articulation of the two crop gathering heads 17a and 17b about their pivotal interconnection to allow for vertical transposition of each end of the main beam in relation to the connection of the main beam with the first wheeled chassis 15 as a result of ground undulation.

To convert from a crop gathering mode as shown in FIG. 1 to a transport mode as shown at FIG. 2 the main beam 21 is disconnected from the first wheeled chassis 15 and the horizontal hinge 20a provided on the main beam 21 is locked. In addition the strut 31 interconnecting the two portions 21a and 21b of the main beam 21 is disconnected from the lug 33 on the second portion 21b and the crop gathering means are raised by means of the hydraulic cylinders 25 to raise them above the fixed wheel 29 on the main beam 21.

As a result of rearward pivotal movement of the second wheeled chassis 19 in relation to the first wheeled chassis 15 the second portion 21b of the main beam is caused to pivot until it takes up an attitude perpendicular to the first portion 21a at which point the strut 31 is re-engaged with the lug 33 provided on the second portion 21b of the main beam. On forward movement of the first wheeled chassis the second wheeled chassis 19 is then caused to pivot about the pivotal connection between the truss frame 35 of the second wheeled chassis and the frame member 37 of the first wheeled chassis, until the second wheeled chassis takes a position trailing behind the first wheeled chassis. The function of the bell crank 41 interconnecting the main beam 21 and the truss frame 35 of the second wheeled chassis is to locate the truss frame in a position where it will locate the second chassis 19 directly behind the first wheeled chassis 15 when in the transport mode.

When in the crop gathering mode as shown in FIG. 1 the outlet chute 45 of each crop gathering head 17a and 17b is in communication with the inlet chute 47 of the crop separating means and the drive for the conveyor in the inlet chute 47 is interconnected with the drive for the cutters, augers and reels (if required) of each crop gathering head. The inlet chute 47 is pivotally mounted to the crop treatment means such that with the vertical movement of the crop gathering means to adjust for varying crop heights the inlet chute will move accordingly and with the raising of the crop gathering means to its transport position the outlet chutes of each crop gathering head will become disengaged from the inlet chute 47.

Figure 3:
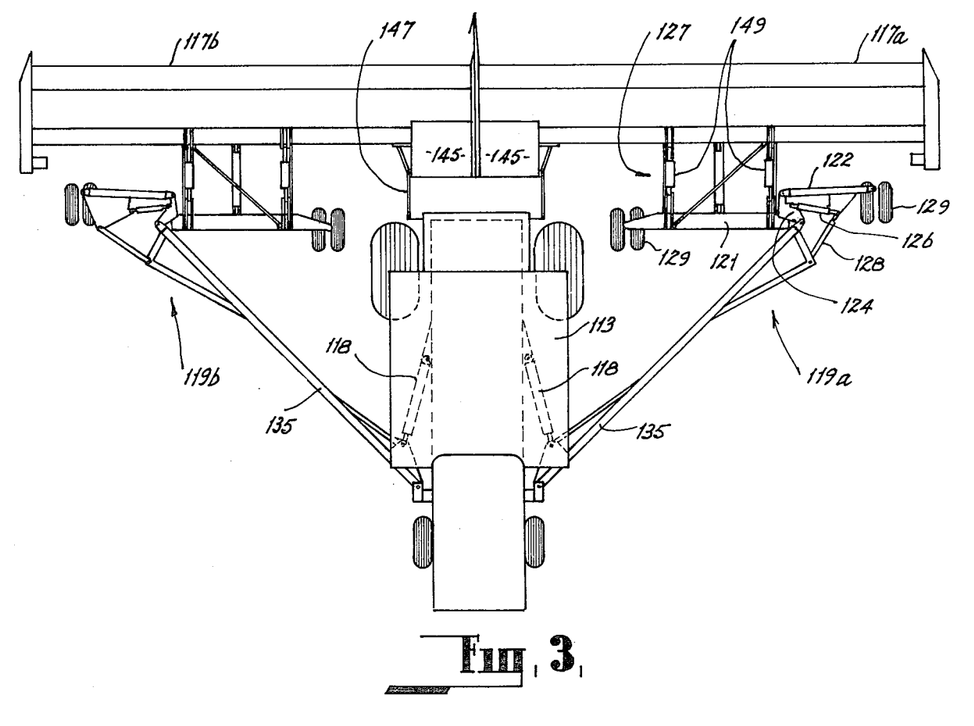
FIG. 3 is a plan view of a self-propelled harvesting combine according to the second embodiment in the crop gathering mode.

The combine of the second embodiment is also of the self-propelled type and comprises a crop separating means 113 supported on a first wheeled chassis (not shown) which also supports a power source and drive means for the wheels of the first wheeled chassis, for the crop treatment machinery and the crop gathering unit. The combine further comprises a crop gathering means consisting of two crop gathering heads 117a and 17b, each supported on a second wheeled chassis 119a and 119b which are substantially the mirror image of each other in plan.

Each second wheeled chassis 119 comprises an elongate frame member 135 pivotally mounted to the rear of the first chassis. A hydraulic cylinder 118 is mounted between the first chassis and the elongate frame 135 to effect and control the pivotal movement of the elongate frame 135. The other end of the elongate frame supports one end of a pair of arms 121 and 122, each pivotally mounted for rotation about a substantially vertical axis and each supporting at their free ends a pair of wheels 129 mounted to the arms via a castoring arrangement. One arm 121 of the pair of arms is rigidly mounted at its one end to a plate member 124. A hydraulic cylinder 126 is mounted between the plate member 124 and the other arm 122 to control the pivotal movement of the other arm with respect to the plate member. The length of the tie rods and the dimensions of the plate and the positions of connection of the tie rods 128 and hydraulic cylinders 126 to the plate on each second wheeled chassis 119 differ such that when in the transport position, the wheels 129 of both chassis clear each other.

The one arm 121 supports the crop gathering head 117 associated with the second wheeled chassis 119 via a support structure 127 which has the form of a parallelogram linkage and which will be described later in further detail in relation to FIG. 5. The support structure 127 incorporates a pair of hydraulic cylinders 149 whereby the crop gathering means 117 can be transposed vertically on the second wheeled chassis 119 while it maintains a substantially constant crop gathering attitude during such vertical transposition.

When the combine is in its crop gathering mode as shown at FIG. 3 the crop gathering heads 117a and 117b are pivotally interconnected in an end to end relationship and their outlets 145 and engaged with the inlet 147 of the crop treatment means 113. In addition the other arm 122 is located substantially parallel with the one arm 121 and a tie rod 128 between the elongate frame 135 and the other arm 122 maintains the other arm substantially parallel with the crop gathering heads 117.

Figure 4:
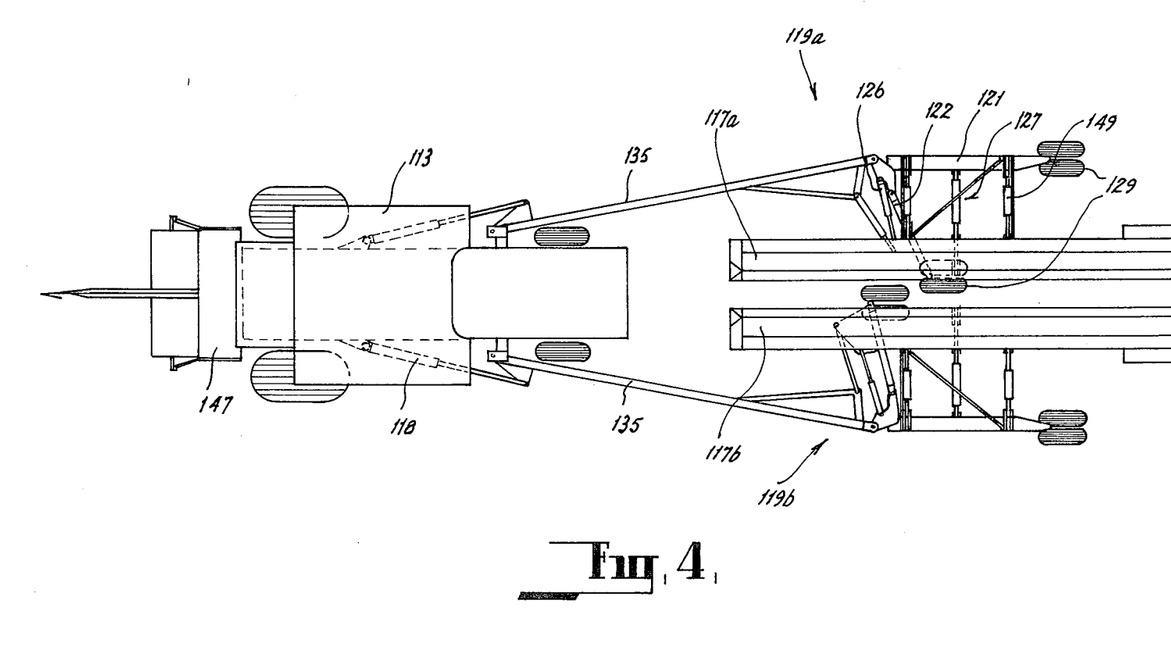
FIG. 4 is a plan view of the harvesting combine of FIG. 3 in the transport mode.

To move the second wheeled chassis 135 and the crop gathering heads 117 to the transport position shown in FIG. 4 the crop gathering heads 117 are raised vertically by means of their support structures 127 and at the upper limits of such movement the outlet of each crop gathering head becomes disengaged from the inlet 147 of the crop treatment means and the crop gathering heads 117 are disconnected from each other. By means of the hydraulic cylinder 126 the other arm 122 is pivoted to a position lying transversely underneath the crop gathering head 177. As a result of such movement and due to the presence of the tie rod 128, the one arm 121 is caused to co-operatively rotate on the elongate frame member 135 into the transport mode with respect to the frame member at which position it is substantially in line with the frame member 135.

With forward movement of the combine and extension of the hydraulic cylinder 118 between the first chassis and the elongate frame 135 the elongate frames pivot rearwardly on the first chassis and the crop gathering heads move to a position in line with the direction of travel where they lie behind the first chassis.

Figure 5A:
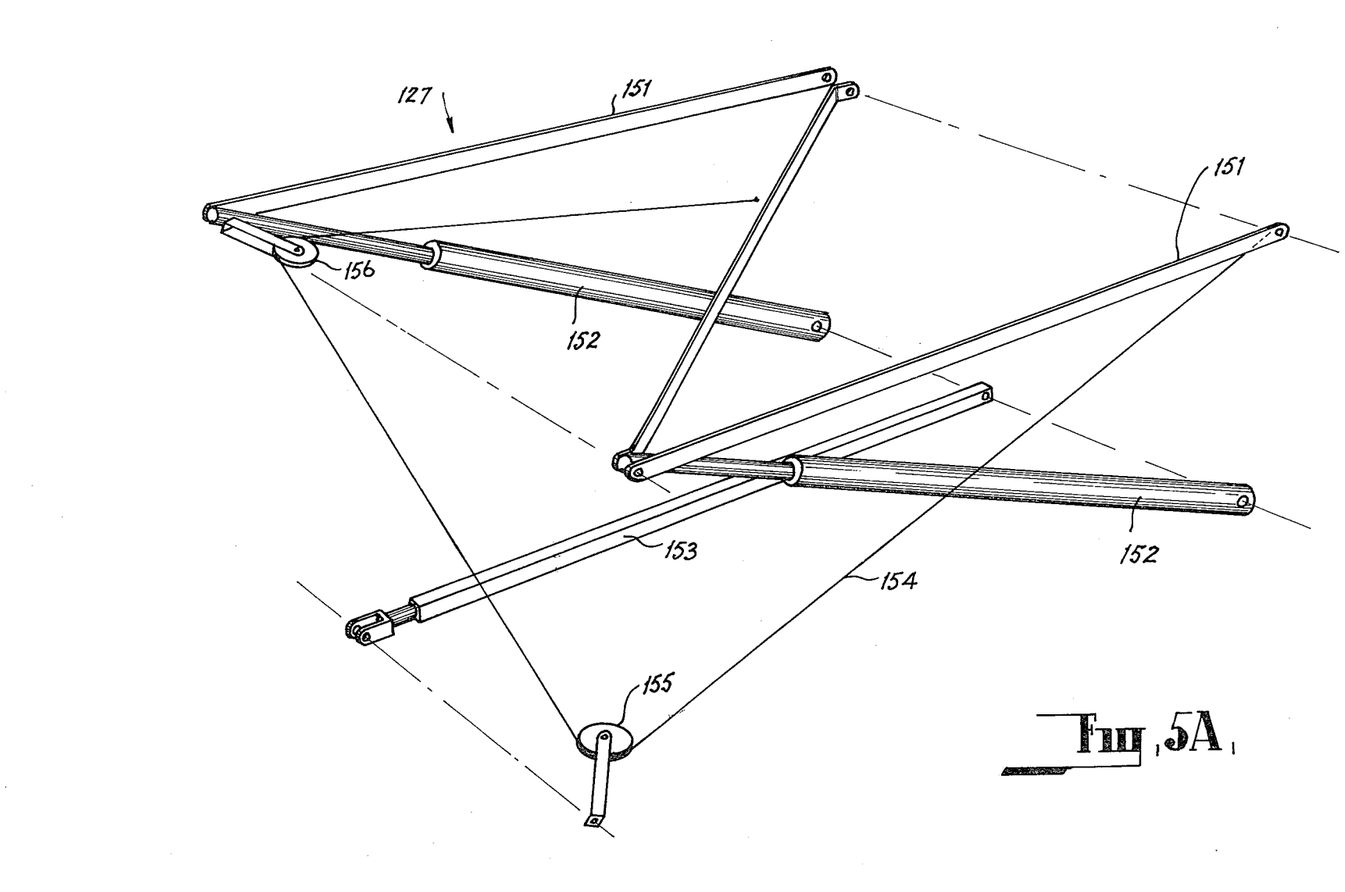
FIGS. 5A and B are oblique views of two forms of support structure which may be used for the crop gathering means of the second embodiment.

A form of the support structure 127 for the crop gathering heads 117 on the second wheeled chassis 119 as shown at FIG. 5A comprises a parallelogram linkage which consists of an upper planar frame having a pair of links 151 pivotally supported at one end to the one arm 121 (not shown in FIG. 5A) and interconnected by a diagonal brace. A pair of hydraulic cylinders 152 are mounted between the other end of the upper links 151 and the one arm 121 at a position spaced downwardly from the mounting of the one end of the upper links 151 thereto. A lower link 153 interconnects the one arm 12 and the crop gathering means 117 in parallel relationship underneath the upper links 151. With extension of the hydraulic cylinders 152, the upper links pivot upwards on the one arm 121 but due to the presence of the lower link 153 the crop gathering means maintains a substantially constant attitude during such vertical movement.

In order to resist pivoting of the crop gathering means 117 on the one arm about a substantially transverse axis a cable 154 is associated with the support structure 127. The cable is mounted at one end adjacent the mounting of one upper link 151 to the one arm 121. The cable then passes around one pulley 155 mounted on a lower portion of the crop gathering means 117 or the adjacent end of the lower link 153, and around another pulley 156 located on the upper portion of the crop gathering means but spaced longitudinally from the one pulley 155. The other end of the cable 154 is fixed to the one arm 121 at a point spaced downwardly from the point of attachment of the other upper link 151. The cable is maintained in a state of tension and serves to control any pivoting action of the crop gathering means about a transverse axis.

Figure 5B:
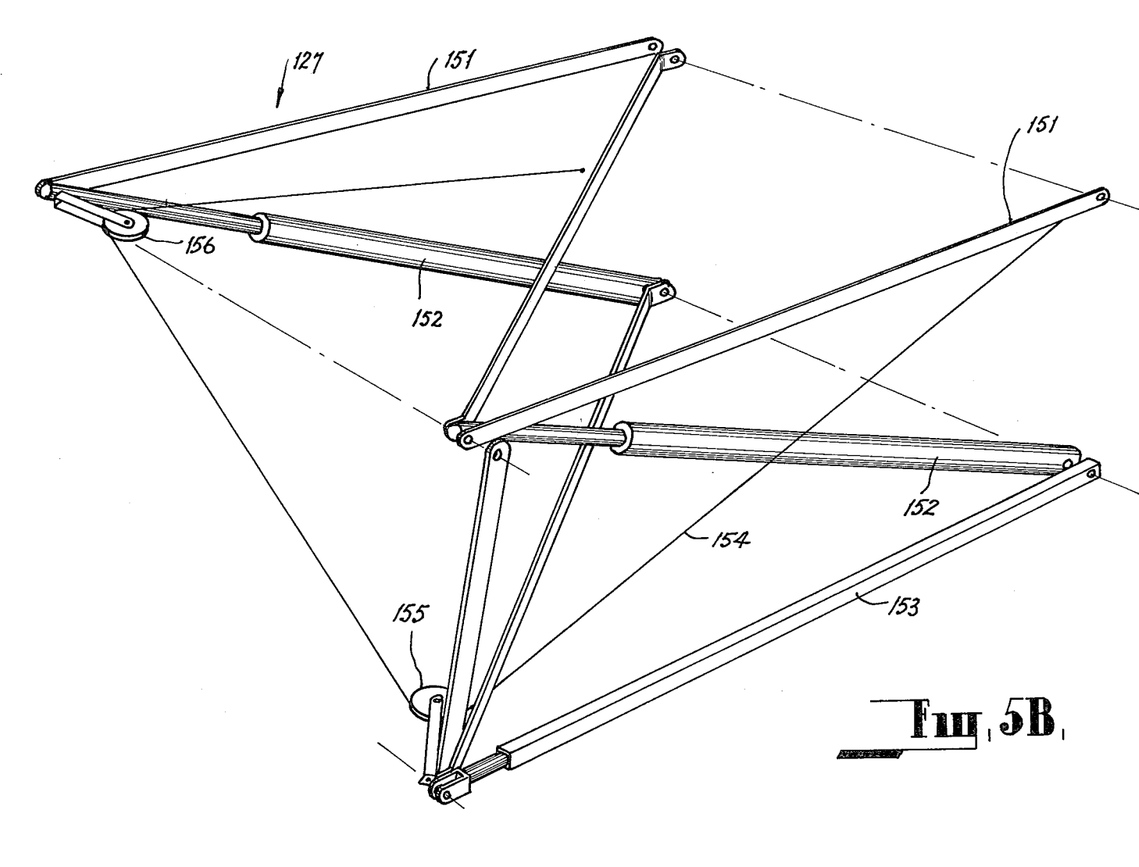

According to an alternative form of the support structure as shown at FIG. 5B, the lower link 153 need not be fixed to the crop gathering means but need only support the lower portion of the crop gathering means. In such a case and in a case where the cable is fixed to the lower link 153, a hydraulic ram may be mounted between the one arm 121 or lower link to cause the gathering means 117 to pivot on the upper links 151 and thus change its attitude.

The interconnection of the outlet of the crop gathering means and the inlet of the crop separating means takes the same form as that of the first embodiment.

The advantages offered by both embodiments described above resides essentially in the fact that the crop gathering means 117 is supported by a wheeled chassis which is independent of the support chassis of the crop separating means. As a result the first wheeled chassis does not require any auxiliary structure to support the crop gathering means and width of cut of the combine can be increased without introducing any excessive loads on the first wheeled chassis.

In addition despite the increased width of cut of the combine, it may be readily converted into a transport position where its width is limited to the width of the first wheeled chassis and not to the width of the crop gathering means.

It should be appreciated that the scope of the present invention need not be restricted to the particular scope of the embodiments described above and in particular it need not be restricted to the particular configuration and arrangement of the second wheeled chassis of the embodiment or to the use of two crop gathering heads in the crop gathering means.

The claims defining the invention are as follows:

1. A self-propelled harvesting combine comprising; a crop treatment means having and inlet and supported on a first wheeled chassis, crop gathering means having an outlet, and crop separating means, wherein the wheeled chassis supports a power source for propulsion of the combine, operation of the crop separating and operation of the crop gathering means; and the crop gathering means is supported on a second wheeled chassis; said second wheeled chassis being pivotally mounted to the first wheeled chassis to be movable between a first position lying beside the first wheeled chassis and a second position trailing behind the first wheeled chassis; said crop gathering means being pivotally mounted on said second wheeled chassis for rotation about a substantially vertical axis between a first position lying transversly on said second wheeled chassis and a second position lying longitudinally thereon; wherein when the second wheeled chassis is beside the first wheeled chassis and the crop gathering means is located transversly on the second wheeled chassis, the crop gathering means lies transversly in front of the crop treatment means and the outlet of the crop gathering means is in communication with the inlet of the crop treatment means.

2. A harvesting combine as claimed at claim 1 wherein the second wheeled chassis is pivotally mounted to the rear of the first wheeled chassis.

3. A harvesting combine as claimed at claim 1 wherein the second wheeled chassis comprises an elongate frame member pivotally mounted at one end to the first wheeled chassis and supported at or towards its other end by a pair of wheels, said crop gathering means being supported by its other end.

4. A harvesting combine as claimed at claim 1 wherein the crop gathering means is supported from the second wheeled chassis by a support structure which facilitates vertical transposition of the crop gathering means with substantially no variation in the attitude of the crop gathering means.

5. A harvesting combine as claimed in claim 4 as dependant on claim 3 wherein each wheel is mounted to the elongate frame via an arm pivotally mounted to the elongate frame.

6. A harvesting combine as claimed at claim 5 wherein both arms support the wheels mounted thereto via a castoring arrangement.

7. A harvesting combine as claimed at claim 5 wherein the one arm is rigidly mounted to an intermediate member which is pivotally mounted to the elongate frame member and the other arm is pivotable on the intermediate member by the action of a hydraulic cylinder between the intermediate member and the other arm.

8. A harvesting combine as claimed at claim 5, wherein the support structure is mounted to said one arm.

9. A harvesting combine as claimed at claim 5, wherein a tie bar is mounted between the elongate frame and the other arm when the crop gathering means is in the first position to maintain the axis of the other arm substantially parallel with the crop gathering means.

10. A harvesting combine as claimed at claim 9 wherein the support structure comprises a substantially planar frame pivotally mounted at one side to the second wheeled chassis about a substantially horizontal axis and pivotally mounted at the other side to the crop gathering means about a horizontal axis, a tie bar pivotally mounted between the first wheeled chassis and the crop gathering means in parallel relationship to the frame and spaced vertically from the frame and at least one hydraulic cylinder mounted diagonally between the first wheeled chassis and the crop gathering means.

11. A harvesting combine as claimed at claim 10 wherein the support structure further comprises a tensioned cable mounted at one end to the second wheeled chassis or crop gathering means adjacent the mounting of the frame and at its other end to the crop gathering means and second wheeled chassis respectively at a point spaced vertically and horizontally from the one end, said cable passing over a pair of pulleys mounted to the crop gathering means, said pulleys being spaced vertically and horizontally from each other.

12. A harvesting combine as claimed at claim 1 wherein a pair of second wheeled chassis are pivotally mounted to the first wheeled chassis with one to each side of the first wheeled chassis, the first position for each second wheeled chassis being beside the corresponding side of the first wheeled chassis to which it is pivotally mounted.

13. A harvesting combine as claimed at claim 12 wherein said crop gathering means of each second wheeled chassis are pivotally interconnected when in the first position on their second wheeled chassis which also are in their first position.

14. A harvesting combine as claimed at claim 1 wherein the elongate frame member is pivotally mounted at its other end to one portion of an arm having two portions pivotally interconnected about a vertical axis, said arm being supported at each end by a wheel and the other portion supporting said crop gathering means.

15. A harvesting combine as claimed at claim 14 wherein the crop gathering means comprises two portions pivotally connected in an end to end relationship with each other.

16. A harvesting combine as claimed at claim 14 wherein when the crop gathering means is in its first position on the second wheeled chassis the portions of the arm are substantially in line with each other and when the crop gathering means is in its second position on the second wheeled structure the other portion of the arm is substantially perpendicular with the one portion.

17. A harvesting combine as claimed at claim 1 wherein the inlet of the crop separating means comprises a chute pivotally mounted to the crop separating means about a substantially horizontal axis and sealingly receiving the outlet of the crop gathering means.

18. A harvesting combine as claimed at claim 17 wherein said inlet contains a conveyor and the drive of said conveyor is detachably connected with the drive of the crop gathering means.

* * * * *